UNITED STATES PATENT OFFICE.

CONRAD SCHRAUBE AND WALTER VOIGTLAENDER-TETZNER, OF LUDWIGSHAFEN-ON-THE-RHINE, GERMANY, ASSIGNORS TO BADISCHE ANILIN AND SODA FABRIK, OF LUDWIGSHAFEN-ON-THE-RHINE, GERMANY, A CORPORATION OF GERMANY.

RED AZO DYE.

SPECIFICATION forming part of Letters Patent No. 718,389, dated January 13, 1903.

Application filed March 8, 1902. Serial No. 97,337. (No specimens.)

*To all whom it may concern:*

Be it known that we, CONRAD SCHRAUBE, a subject of the King of Prussia, Emperor of Germany, and WALTER VOIGTLAENDER-TETZNER, a subject of the King of Saxony, both doctors of philosophy and chemists, and residents of Ludwigshafen-on-the-Rhine, in the Kingdom of Bavaria, Germany, have invented new and useful Improvements in a new Azo Coloring-Matter, of which the following is a specification.

This invention relates to coloring-matter which dyes wool a red shade which is of remarkable fastness to fulling.

In carrying out this invention one molecular proportion of benzidin is converted into its tetrazo compound, and this is combined with one molecular proportion of 2-naphthol-6.8-disulfo-acid, and the diazo-azo substance so resulting is suitably combined with one molecular proportion of para-cresol. In place of benzidin tolidin may be employed with equally good results. The shade produced by this product is, however, of a slightly-bluer cast than the product obtained from benzidin. Hereinafter benzidin and tolidin will be regarded as included in the generic term "diamido base."

The following example will show how this new coloring-matter can be obtained. The parts are by weight.

Example: Tetrazotize eighteen and four-tenths (18.4) parts of benzidin in the manner well known in the art with sixty (60) parts of hydrochloric acid containing about thirty-two (32) per cent. of that acid (HCl) and fourteen (14) parts of sodium nitrite containing about one hundred (100) per cent. of that salt ($NaNo_2$) and combine it in the usual manner with the solution obtained from thirty-four and eight-tenths (34.8) parts of the neutral sodium salt of 2-naphthol-6.8-disulfo-acid and forty (40) parts of calcined carbonate of soda in about eight hundred (800) parts of water, so as to produce the intermediate diazo-azo substance hereinbefore mentioned. After the union is completed add to this intermediate product a solution obtained from ten and eight-tenths (10.8) parts of para-cresol and twelve (12) parts of caustic-soda solution containing thirty-five (35) per cent. of caustic soda (NaOH) in about one hundred and fifty (150) parts of water. When the union is completed, salt out and filter off the coloring-matter.

In place of the eighteen and four-tenths (18.4) parts of benzidin employed twenty-one and two-tenths (21.2) parts of tolidin may be employed with the result hereinbefore stated.

In the dry and powdered form this new coloring-matter is of a brown-red color, which is soluble in water, producing a red solution. Hydrochloric acid added to this solution produces a brown precipitate, and the addition of caustic soda to the aqueous solution changes the color to a dull dirty red.

This coloring-matter produces a violet color with concentrated sulfuric acid, and when this is diluted with water a precipitate of a dirty-red-brown color is produced. This coloring-matter dissolves in ethyl alcohol, producing a solution having a red color. When this coloring-matter is suitably treated with zinc-dust and caustic soda, the result filtered, and the filtrate extracted with ether, the ether extract contains the hereinbefore-defined diamido base which was employed in the production of the coloring-matter. The aqueous liquor which has been extracted by ether on suitable treatment with carbonic acid yields 3-amido-4-hydroxy-toluene.

When this coloring-matter is suitably treated with stannous chlorid and hydrochloric acid and the precipitate resulting is filtered off and the filtrate suitably treated with common salt, 1-amido-2-naphthol-6.8-disulfo-acid is obtained.

What is claimed is—

1. As a new article of manufacture azo coloring-matter which on suitable treatment with zinc-dust, caustic soda and carbonic acid yields a hereinbefore-defined diamido base and 3-amido-4-hydroxy-toluene and on suitable treatment with stannous chlorid, hydrochloric acid and common salt yields 1-amido-2-naphthol-6.8-disulfo-acid.

2. As a new article of manufacture azo coloring-matter which can be prepared from tetrazotized benzidin, para-cresol and 2-naphthol-6.8-disulfo-acid, which on suitable treatment with zinc-dust, caustic soda and carbonic acid yields benzidin and 3-amido-4-hydroxy-toluene and on suitable treatment with stannous chlorid, hydrochloric acid and common salt yields 1-amido-2-naphthol-6.8-disulfo-acid.

In testimony whereof we have hereunto set our hands in the presence of two subscribing witnesses.

CONRAD SCHRAUBE.
WALTER VOIGTLAENDER-TETZNER.

Witnesses:
JOHN L. HEINKE,
JACOB ADRIAN.